D. G. WOODS.
DITCHING MACHINE.
APPLICATION FILED MAY 24, 1910.
1,008,765.
Patented Nov. 14, 1911.
4 SHEETS—SHEET 4.
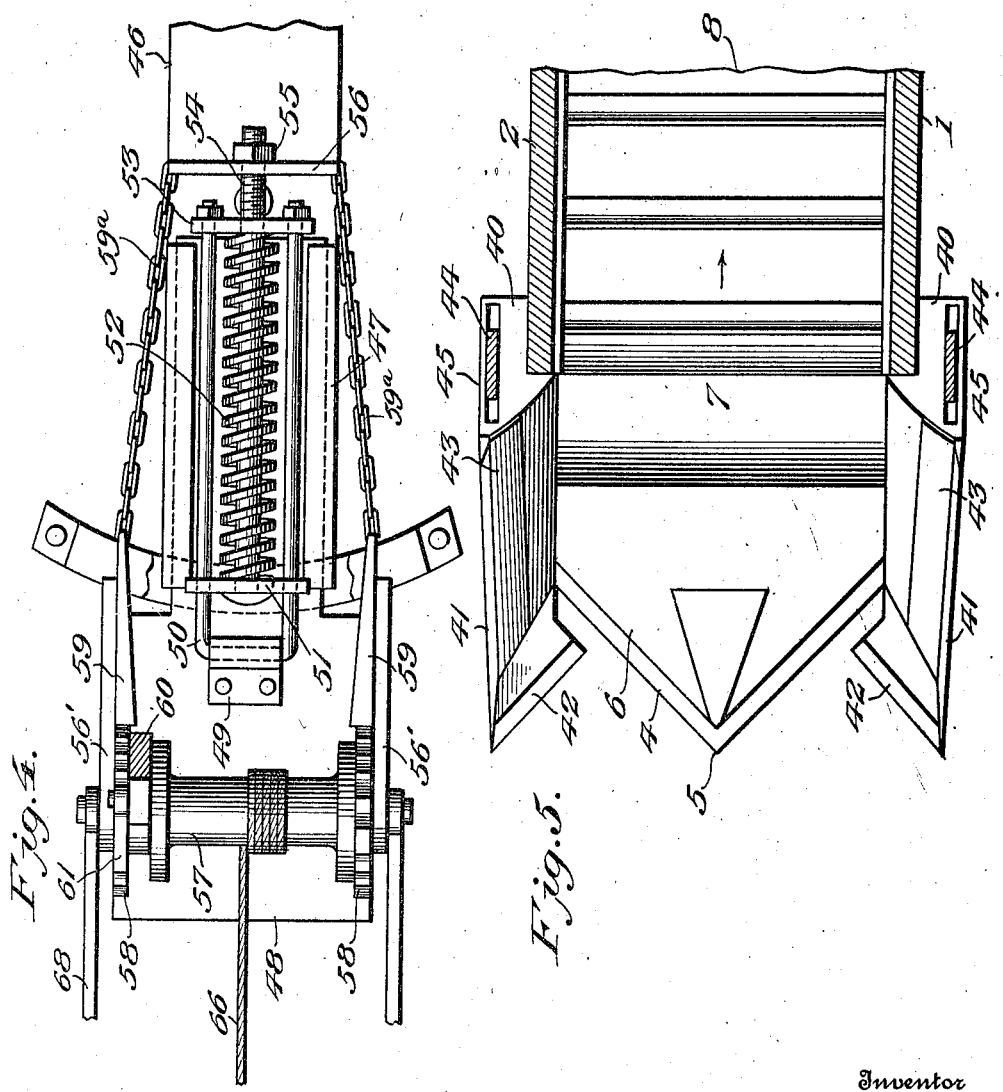
Witnesses
E. F. McKee
Inventor
Daniel G. Woods
By Victor J. Evans
Attorney

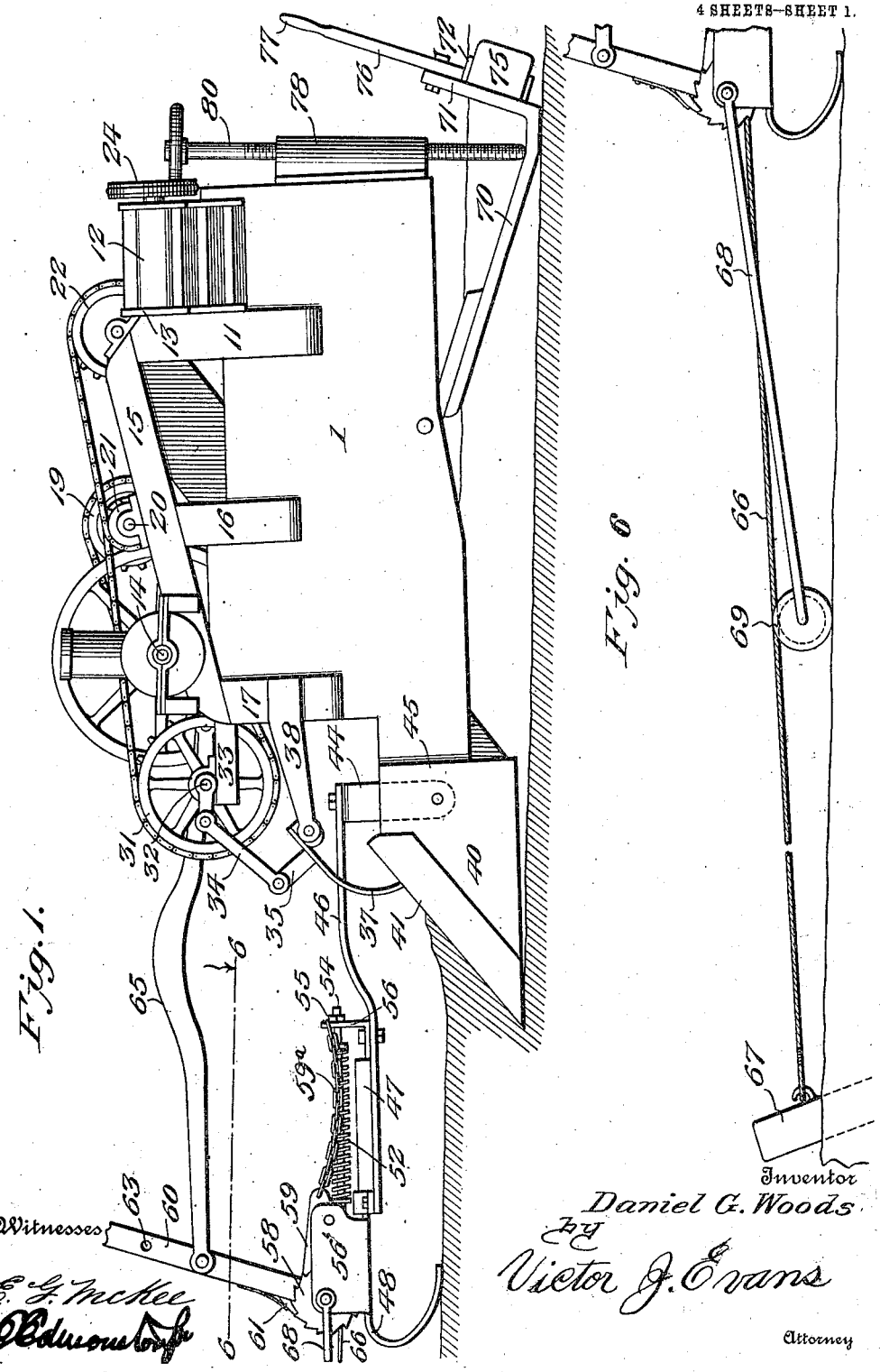

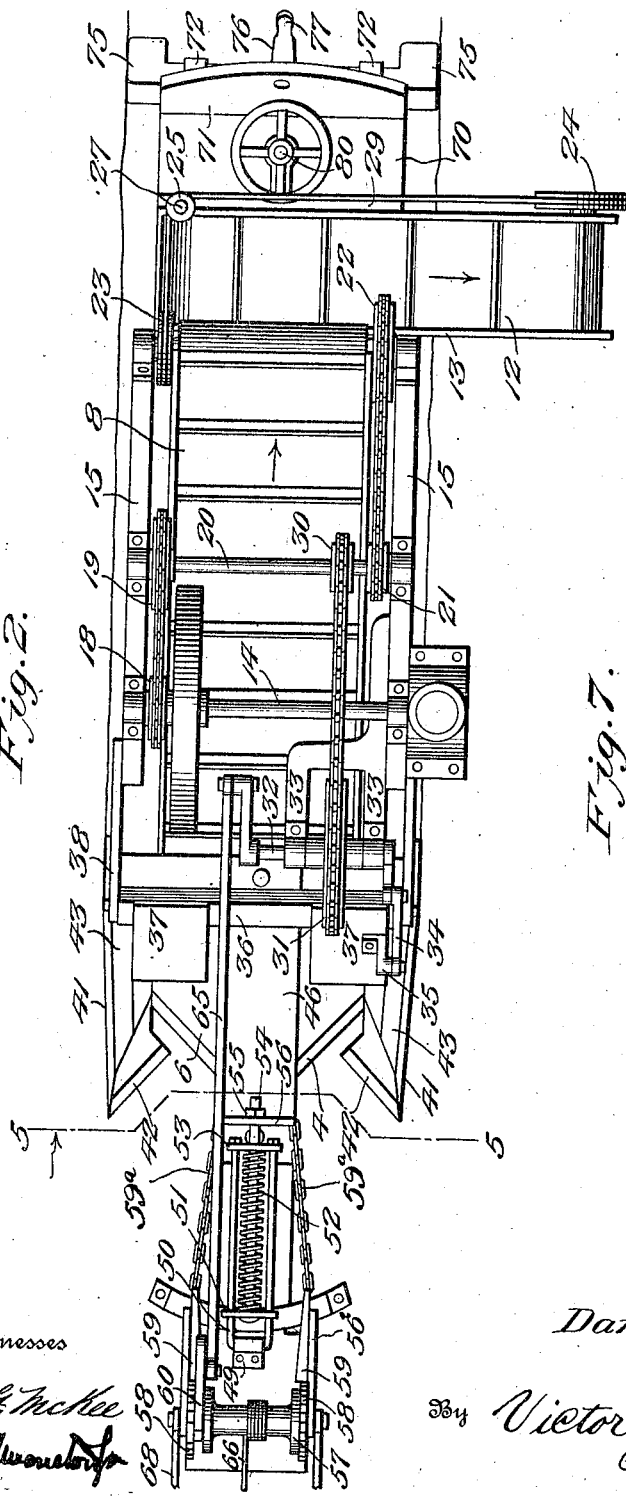
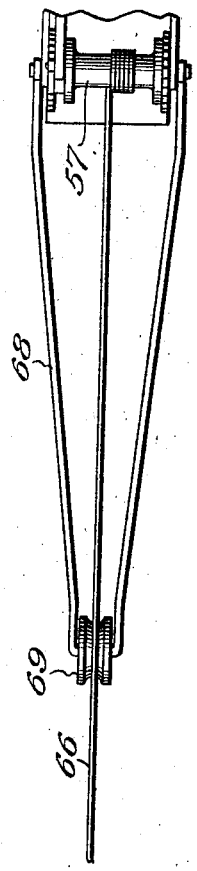

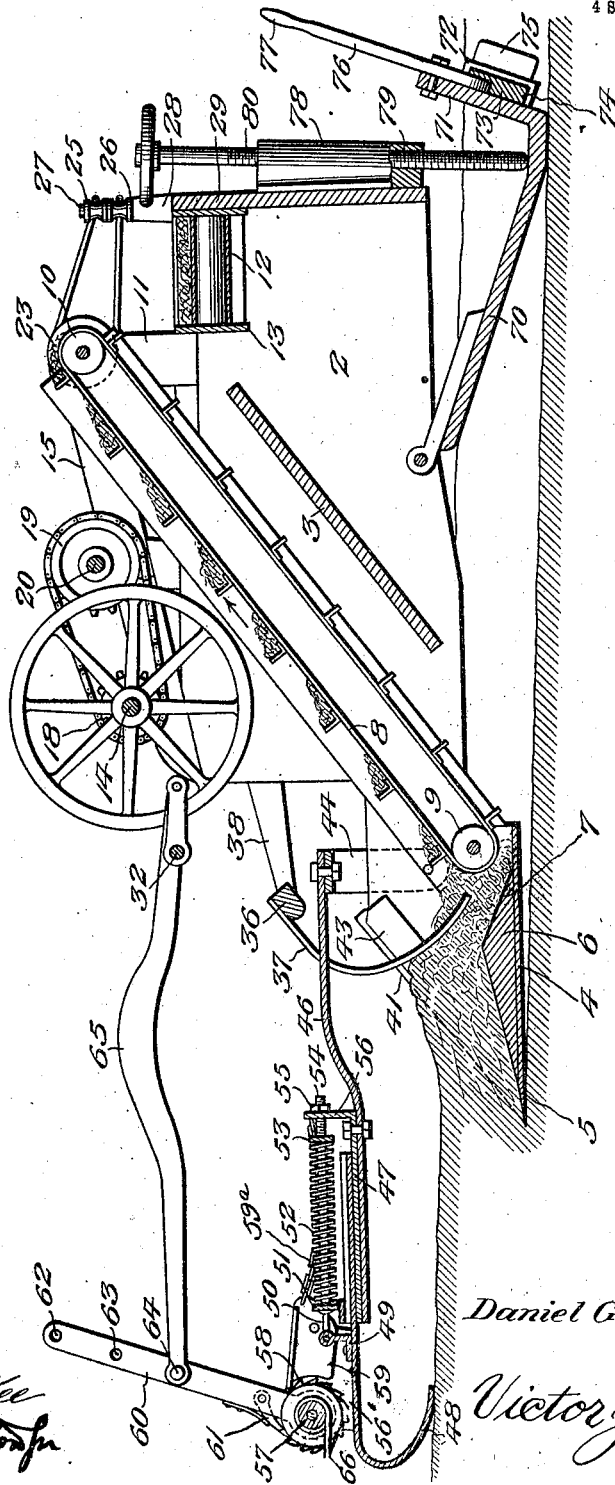

UNITED STATES PATENT OFFICE.

DANIEL G. WOODS, OF NEW ORLEANS, LOUISIANA.

DITCHING-MACHINE.

1,008,765.

Specification of Letters Patent.　Patented Nov. 14, 1911.

Application filed May 24, 1910. Serial No. 563,142.

*To all whom it may concern:*

Be it known that I, DANIEL G. WOODS, a citizen of the United States, residing at New Orleans, in the State of Louisiana, have invented new and useful Improvements in Ditching-Machines, of which the following is a specification.

This invention relates to a ditching machine and one object of the invention is the provision of a novel, cheap and efficient machine of this character which carries its own propelling power and which will accomplish in an ordinary working day, the work of approximately fifty men.

Another object of the invention is the provision of novel means for interrupting the travel of the machine automatically upon the engagement of the cutting blades with an obstacle such as a stump or a large rock, thus avoiding the breaking of the cutting blades and the possible destruction of other parts of the machine.

Further objects of the invention will appear as the specific description which follows is read in connection with the accompanying drawings forming a part of this specification and in which:

Figure 1 is a side elevation. Fig. 2 is a top plan view. Fig. 3 is a longitudinal sectional view. Fig. 4 is a detail horizontal section on the line 6—6 of Fig. 1. Fig. 5 is an enlarged detail horizontal section taken through the forward portion of Fig. 1 immediately above the cutting blade. Fig. 6 is a detail side elevation. Fig. 7 is a top plan view thereof.

Referring more especially to the drawings, 1 and 2 represent the side members which are connected together in their center by a bridge 3 and the central cutting blade 4 which is bridged across the forward portion of the side members and presents a V-shaped cutting point 5. Upon the upper portion of the blade 4 is mounted a shield 6 which is inclined upwardly from the point of the blade and its cutting edges to a point approximately half of its length where it tapers downwardly as at 7 to provide a sort of receptacle in which the lower end of the main conveyer 8 is adapted to move. This conveyer is mounted at its lower end upon a roller 9 journaled in the side members 1 and 2 and at its upper end travels over a roller 10 journaled in bearings on vertical arms 11 secured to the side members 1 and 2. The rear end of the conveyer is adapted to discharge the dirt received thereon to an auxiliary conveyer 12 mounted in a frame 13 arranged at right angles to the conveyer 8 and projecting a considerable distance beyond the side 1 of the machine so as to deliver the dirt to one side of the ditch which is formed. These conveyers are driven by mechanism which will now be described. Mounted upon the side 2 of the frame is a motor of any suitable character such as a gasolene engine which has its driving shaft 14 journaled in bearings upon a longitudinal beam 15 mounted upon the arms 11, 16 and 17 projecting upwardly from the sides of the machine. This shaft 14 has secured to it a belt pulley 18 which is belted to a pulley 19 upon a counter-shaft 20 journaled in bearings on the longitudinal bars 15. To the counter-shaft is connected a suitable pulley 21 which is belted to a larger pulley 22 on the roller 10 and the opposite end of the roller is provided with a smaller pulley 23 which is belted to a larger pulley 24 secured to the outer roller of the conveyer 12. The belt which connects the pulleys 23 and 24 passes over idlers 25 and 26 both rotating independently on a stub shaft 27 projecting upwardly from a bracket 28 on the end member 29 which is bridged between the side members 1 and 2. From the gearing shown, it will readily be seen that the conveyer 12 is driven at a greater speed than the conveyer 8 in order that the smaller conveyer may take off the quantity of dirt delivered thereto by the large conveyer 8. The counter-shaft 20 is also provided with a pulley 30 which is belted to a considerably larger pulley 31 mounted upon a crank shaft 32 journaled in bearings carried by a bifurcated bracket 33 secured to the side 1. To one end of the crank shaft 32 is connected a link 34 whose other end has pivotal connection with an arm 35 rigidly secured to the oscillatory shaft 36 upon which the feeding cutters 37 are mounted. The shaft 36 is journaled in the outer ends of the forwardly extending arms 38 mounted upon the arms 17 and is adapted to throw the cutters 37 so that they will engage the dirt as it is dislodged by the cutter and force it to a position in the receptacle 7 whereby it may be taken up by the conveyer 8. This reciprocating device is also adapted to chop up the dirt as it is displaced and reciprocates considerably slower relatively than the travel of the conveyer so that at no time is an excess of material fed to said conveyer to check the action of the same.

Secured to the side members 1 and 2 adjacent their forward end, are blade supporting members 40 upon which the side cutting blades 41 are mounted and upon which is also mounted the edging foot cutters or blades 42. The side cutters 41 have connected to them a shearing plate 43 which is mounted on the outer face of the members 40 and conforms to the incline of the outer end of the side members, thus when the dirt upon the sides of the ditch is displaced by the cutters 41 it will be forced inwardly by the shearing members 43 in the path of the cutters 37. These shearing members simply taper inwardly and downwardly from the cutters 41 to the side edges of the blade 4 and bring the material into the path of the cutters 37.

Pivoted to the sides of the members 40 is a yoke member 44 whose pivotal ends are covered by a protecting plate 45 so that they will not catch upon the sides of the ditch. Secured to the central portion of the yoke member and extending forwardly of the machine is a draft bar 46 upon which is pivoted a supporting plate 47 in which is slidably mounted the supporting foot 48 of the draft bar. Projecting upwardly from the supporting foot is a clip 49 to which is removably secured a U-shaped strain member 50 upon which is slidably mounted a bridge piece 51 against which the adjusting spring 52 is adapted to bear. The opposite end of the spring 52 bears against a bridge plate 53 which is secured to the end of the strain members 50 and passing through the bridge members 51 and 53 is an adjusting screw 54 which is prevented from pulling through the bridge plate 51 by an upset head. The inner end of the adjusting screw has threaded thereon an adjusting nut 55 which bears against the upturned end 56 of the supporting plate 47.

The sides of the supporting foot are turned up to form bearing plates 56' in which is journaled a cable drum 57 having ratchet wheels 58 secured thereto which are engaged by the releasing pawls 59 pivoted to the bearing plates 56'. Journaled upon the shaft upon which the drum 57 is mounted is an operating lever 60 which has pivoted to its outer face an operating pawl 61 adapted to engage one of the ratchets 58 and intermittingly operate the drum. This operating lever 60 is provided with a plurality of stub shaft bearings 62 and 63 in which the stub shaft 64 may be secured. The stub shaft 64 is connected to the crank shaft 32 by a pitman 65 so that upon the operation of the crank shaft 32 by its belted connection with the counter-shaft 20 and the driven shaft 14, the operating lever 60 is reciprocated. During its forward movement, the pawl 61 engages the ratchet 58 and rotates the drum 57 and in its rearward movement, the pawl 61 rides idly over the ratchet and the pawls 59 prevent retrograde movement of the drum. Connected to the pawls 59 and to the upturned end 56 of the supporting plate 47 are slack chains 59ª which, when the cutters encounter an immovable object and the supporting foot moves forward as the drum continues to wind intermittingly on the cable, will withdraw the pawls 59 and thus interrupt the action of the drum and the progress of the machine.

A suitable cable 66 is secured to the drum and adapted to be wound thereon and upon the outer end of the cable is mounted any preferred type of anchor 67 which is secured in the ground. Thus, when the drum is rotated in the proper direction and the cable wound up, the machine will be pulled toward the anchor. In order to support and guide the cable between the anchor and the drum I pivotally secure to the foot 48 a pair of arms 68 which are connected at their ends in order to afford a journal for a guiding pulley 69 over which the cable travels.

Journaled between the sides adjacent the rear end of the machine is a bearing plate 70 whose outer end is flanged as at 71 to form a supporting member for the bearings 72 in which the guiding slide 73 is mounted. This slide comprises a transverse bar 74 which has secured upon its outer ends ditch engaging members 75 and is provided with a socket in its center adapted to receive the short end of the operating lever 76 which is pivotally mounted upon the flange 71 and provided with an operating handle 77. By sliding this handle in either direction either one of the ditch engaging members are made to bear more firmly on one side of the ditch than on the other, thus throwing the machine laterally to the opposite side and making the plates take a different course. In order to raise and lower the plate 70, there is secured upon the end piece 29, an enlarged boss 78 which is provided with a vertically threaded aperture 79 adapted to receive the adjusting screw 80. This adjusting screw passes through the box 78 and has its lower end engaging the upper face of the plate 70. When it is designed to lower the machine, the screw is unscrewed and the weight of the machine gradually forces the plate upwardly toward the sides. The opposite movement of the screw will raise the sides from the plate 70 and thereby depress the forward portion of the machine and consequently cause entrance of the blades into the ground.

Having thus described the invention, what is claimed is—

1. In a ditching machine, the combination with an anchored draft cable, of a drum support slidably mounted on the machine, a mechanically operated drum carried thereby, means for interrupting the action of the drum when the machine encounters an immovable object, and elastic means interconnecting the machine and drum support for adjustably controlling the operation of the interrupting means.

2. In a ditching machine, having ditching cutters, the combination with an anchor draft cable, of a mechanically operated winding drum slidably mounted upon the machine for winding the cable, an adjustable and elastic device connecting the drum and the machine, and means controlled by the device for interrupting the action of the drum when the cutters encounter an immovable object.

3. In a ditching machine having ditching cutters, the combination with an anchored cable of a winding drum for said cable, ratchet means to operate said drum, means to prevent retrograde movement of the drum, and means acting upon the engagement of the cutters with an immovable substance to render inoperative said preventing means.

4. In a ditching machine having ditching cutters, the combination with an anchored cable, a winding drum carried by the machine for the cable, a ratchet lever for operating the drum, means carried by the machine for operating said lever, means for preventing retrograde movement of the drum, and means independent of the lever operating mechanism for interrupting the action of the retrograde preventing means upon engagement of the ditching cutters with an immovable substance.

5. In a ditching machine having ditching cutters, the combination with an anchored cable, a drum carried by the machine for winding said cable and having ratchet wheels thereon, a lever having a pawl arranged to operate said drum in one direction of its movement, and to ride idly over the ratchet in the other direction of its movement, means for preventing retrograde movement of the drum, and means for rendering said last named means inoperative upon engagement of the ditching cutters with an immovable object.

6. In a ditching machine, having ditching cutters, the combination with an anchored cable, of a drum for winding said cable, means for intermittingly operating said drum, a pair of pawls for preventing retrograde movement of the drum, and a flexible connection between the machine and the pawls for releasing the pawls upon the engagement of the ditching cutters with an immovable object together with a resilient connection between the machine and cable which governs the release of the pawls.

7. In a ditching machine having ditching cutters, the combination with an anchored cable, of a pivoted support carried by the machine, a drum slidably and pivotally mounted upon said support, means for intermittingly operating said drum in one direction, means for preventing retrograde movement of the drum, means connected to the machine and to said retrograde preventing means adapted to render said retrograde preventing means inoperative upon the engagement of the ditching cutters with an immovable object, and an adjustable connection between the drum and drum support.

8. In a ditching machine having ditching cutters, the combination with a cable anchored at one end, of a supporting arm pivotally carried by the machine, a drum support slidably and pivotally mounted upon said arm, a cable winding drum mounted on the support, means for intermittingly operating said drum in one direction, a pair of pawls carried by the drum support adapted to prevent retrograde movement of the drum, a flexible connection between the drum support and the pawls, and an adjustable spring connection between the arm and the drum support which regulates the release of the pawls.

In testimony whereof I affix my signature in presence of two witnesses.

DANIEL G. WOODS.

Witnesses:
HENRY W. FISHER,
JOHN R. ROBERTS.